United States Patent [19]

Fracalossi et al.

[11] Patent Number: 4,458,034
[45] Date of Patent: Jul. 3, 1984

[54] FLAME RETARDANT, CHAR-FORMING, FLEXIBLE POLYURETHANE FOAMS

[75] Inventors: Roland N. Fracalossi; Mark T. Wajer, both of Baltimore, Md.

[73] Assignee: Wm. T. Burnett & Co., Inc., Baltimore, Md.

[21] Appl. No.: 413,699

[22] Filed: Sep. 1, 1982

Related U.S. Application Data

[63] Continuation of Ser. No. 905,544, May 12, 1978, abandoned, which is a continuation-in-part of Ser. No. 656,579, Feb. 9, 1976, abandoned.

[51] Int. Cl.$^3$ ............................................. C08L 75/04
[52] U.S. Cl. .................................. 521/107; 521/109.1; 521/118
[58] Field of Search ................ 521/107, 109, 116, 118

[56] References Cited

U.S. PATENT DOCUMENTS

| | | | |
|---|---|---|---|
| 2,999,823 | 9/1961 | Dombrow | 521/107 |
| 3,004,934 | 10/1961 | Dosmann et al. | 521/109 |
| 3,753,933 | 8/1973 | Olstowski et al. | 521/109 |
| 3,867,320 | 2/1975 | Gambardella et al. | 521/107 |
| 3,872,034 | 3/1975 | Dickert | 521/107 |
| 3,909,464 | 9/1975 | Anorga | 521/116 |
| 3,956,202 | 5/1976 | Iwasaki | 521/109 |
| 4,139,501 | 2/1979 | Rudner | 521/118 |
| 4,230,822 | 10/1980 | Murch et al. | 521/107 |
| 4,291,129 | 9/1981 | Kennedy | 521/107 |
| 4,317,889 | 3/1982 | Pcolinsky, Jr. | 521/107 |
| 4,374,207 | 2/1983 | Stone et al. | 524/118 |

FOREIGN PATENT DOCUMENTS

| | | |
|---|---|---|
| 705937 | 3/1965 | Canada . |
| 45-9957 | 4/1970 | Japan . |
| 1440831 | 6/1976 | United Kingdom . |

OTHER PUBLICATIONS

John W. Lyons, "Mechanisms of Fire Retardation With Phosphorus Compounds: Some Speculation"–Flammability of Solid Plastics–vol. 7, Fire & Flammability Series, C. Hilado, editor, Technomic Pub. Co., Westport Conn. (1974) pp. 228–337.

Florence L. Bennett et al., "Rigid Urethane Foam Extended With Starch," J. Cellular Plastics, Aug. 1977, pp. 369–373.

Primary Examiner—Veronica P. Hoke
Attorney, Agent, or Firm—A. W. Breiner

[57] ABSTRACT

Flame retardant, char-forming, flexible polyurethane foams are described which include, in addition to suitable diisocyanates and other basic foam-forming components, a flame retardant material and a polyol which has substantially non-reactive hydroxyl groups with respect to the diisocyanate component under the conditions of the foam-forming reaction. Accordingly, the polyol remains in the finished polyurethane foam substantially unreacted. When the finished foam product is subjected to combustion conditions the flame retardant material and unreacted polyol combine to retard flame formation and to provide a dripless char. In addition to the flame retardant and char-forming characteristics, the flexible polyurethane foam is firm, permitting the manufacture of clickable foams.

16 Claims, No Drawings

FLAME RETARDANT, CHAR-FORMING, FLEXIBLE POLYURETHANE FOAMS

This is a continuation of application Ser. No. 905,544 filed May 12, 1978, now abandoned which in turn is a continuaton-in-part of application Ser. No. 656,579 filed Feb. 9, 1976, now abandoned.

THE INVENTION AND BACKGROUND

This invention relates to flame retardant polyurethane foams. More particularly, it relates to flexible polyurethane foams which are flame retardant and, additionally, when subjected to combustion temperature are substantially dripless, forming a char during combustion. The flexible polyurethane foams comprise in addition to suitable diisocyanates, polyols, and additives, a flame retardant material and a polyol having hydroxyl groups which are substantially non-reactive with the diisocyanate component of the foam-forming formulation during the course of the foam-forming reaction.

The desirability of flame retardant foams for many applications has been recognized. Efforts have been made to render flexible polyurethane foams flame retardant by the addition of various compounds to the basic composition used to produce cellular foam products. These compounds include both organic and inorganic materials containing in their molecular structure the elements phosphorus, antimony, boron; and the halogens such as chlorine and bromine. Additionally, in providing flame retardant foams efforts have been made to chemically bond within the foam-forming polyol, such as the polyester and polyether polyols, large hydroxyl group containing molecules including starch, glucose, and the like. These efforts have been directed to rigid foams and not flexible foams. While flexible polyurethane foams produced in accordance with prior art techniques will meet certain flammability standards, the foams produced are characterized during combustion by undesirable melting and dripping of the cellular structure. The molten material can be hazardous due to its uncontrolled transport or flow from the site of the flames to surrounding or underlying surfaces. Moreover, it has been found that conventional flame retarding techniques often result in foams which are unduly soft, precluding the manufacture of clickable foams.

More recently, the reduction or elimination of melting and dripping characteristics in flexible foams as noted above, in addition to flame retardant properties, has been emphasized by the industry. The non-dripping characteristic is not only desirable from the standpoint of reducing the hazards of flaming droplets, but is critical from the standpoint of safety in certain applications where the melting and dripping of the foam provides a substantial hazard to the public as a result of the extreme heat of the droplets formed. In an effort to eliminate dripping of the molten material, it has been suggested that the level of flame retardants incorporated into the polyurethane foaming composition, particularly the phosphorus and antimony base compounds, be substantially increased. Although this method has met with limited success, the flexible foams produced are substantially more costly due to the high cost of the flame retardant and, further, the presence of the larger quantities of flame retardants within the polyurethane polymer results in poorer physical properties, particularly a lower level of firmness. Further, it is often difficult to control the foaming and polymerization reaction. It is, therefore, necessary from a practical standpoint to limit the amount of flame retardant material used.

OBJECTS AND GENERAL DESCRIPTION OF INVENTION

Accordingly, a primary object of the present invention is to provide a flame retardant flexible polyurethane foam which is char-forming without degrading of the properties of the polyurethane foam.

It is another object of this invention to produce a flame retardant flexible polyurethane foam with non-dripping characteristics during combustion, i.e., is char-forming, which has a high degree of firmness.

It is still another object of this invention to provide a flame retardant flexible polyurethane foam with non-dripping characteristics during combustion, i.e., is char-forming, which utilizes a lower level of relatively expensive flame retardant components.

It is another object of this invention to provide a flame retardant flexible polyurethane foam with non-dripping characteristics during combustion, i.e., is char-forming, which can be produced in varying, but controlled densities.

These and other objects of the invention will be more readily apparent from the following detailed description and illustrative examples.

Briefly, the objects of the present invention are accomplished by addition of a compound into a basic flexible polyurethane foam-forming formulation, including a flame retardant component, prior to the foam-forming reaction, which has a large number of hydroxyl groups that are substantially non-reactive with the diisocyanate component of the foam-forming formulation under the conditions of the foaming. These compounds, as will be developed more fully hereinafter, are preferably polyols having a relatively high molecular weight, i.e., a molecular weight in excess of about 800, and/or have sterically hindered hydroxyl groups which render the hydroxyl groups in the polyol molecule essentially non-reactive with the diisocyanate component of the foam-forming reaction mixture under foam-forming conditions. Accordingly, the finished cellular polyurethane product of this invention will include the polyol uniformly dispersed, preferably as small particles which remain undissolved during the course of the foam-forming reaction, throughout the foam. It is theorized that these polyols co-act with the flame retardants in the polyurethane foam when the foam is subjected to combustion temperatures, eliminating dripping and providing a char-forming environment. The mechanism leading to this phenomenon is not completely understood but it is theorized that flame retardants perform their function of retarding flame in large part by dehydration reactions or by halogenation, followed by dehalogenation reactions. The presence of the polyols in accordance with the present invention removes the water from the urethane foam during combustion, or when exposed to combustion temperatures, increasing the viscosity of the molten material thereby forming a carbon-rich char which is non-dripping in character. These reactions are facilitated in the presence of hydroxyl-bearing components as follows:

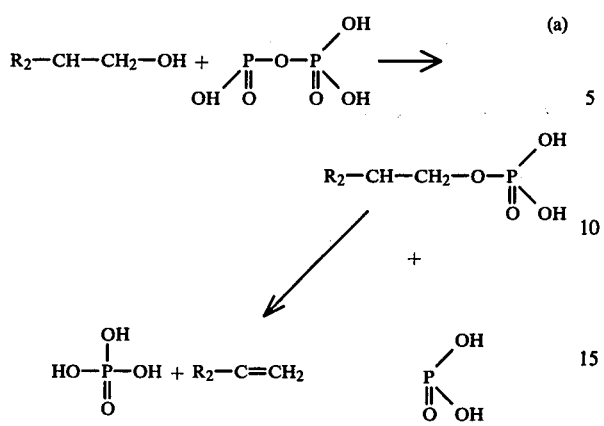

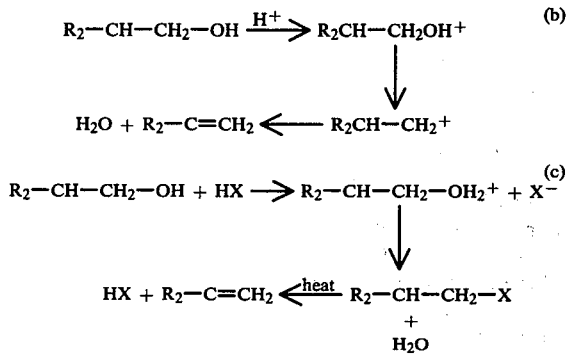

The liberated phosphoric acid acts catalytically as a dehydrating agent to assist in the formation of carbon-char and water.

In addition to providing a char-forming, dripless, flexible polyurethane foam, the presence of the high molecular weight polyol permits the use of lower amounts of flame retardant material to obtain effective flame retardation. Since the polyols are less expensive than the flame retardant, a cost advantage is obtained. Moreover, the foam obtained in accordance with the present invention, although flexible, is firmer than if the normal amount of flame retardant material were employed. It is possible to produce flexible foams in accordance with the present invention which are of varying density, all having the necessary firmness required for most applications. Thus, it has been found that in accordance with this invention preferably the foams will range in density from about 1.7 pounds per cubic foot to 6 pounds per cubic foot. However, lower and higher densities ranging down to as low as about 1 pound per cubic foot and up to about 8 pounds per cubic foot are possible depending in large measure, not upon any limitations imposed by the polyhydroxy compounds, but upon the ability to produce such densities with currently available flame retardants in combination with known flexible urethane systems. The presence of the polyol compound does not contribute to compatibility problems with either the flame retardants or the basic components of the urethane foam system.

The polyol added to the foam-forming compositions together with the conventional flame retardant to increase the char formation during combustion of the produced foam, as noted above, are any of the polyols wherein the hydroxyl groups are substantially non-reactive with the isocyanate of the foam-forming composition under the conditions of the foaming reaction. These polyols normally have a molecular weight of at least about 800 up to several million—the upper limit not being critical, or the hydroxyl groups are sterically hindered. Preferred polyols for use in this invention are the following:

(1) Polyols having the empirical formula of $(C_6H_{10}O_5)_x$ and a suggested structural formula

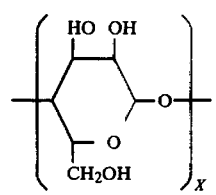

wherein X is in excess of about 60, exemplified by cellulose and starch, including the polysaccharides. Cellulose, as employed herein, includes the granular or fibrous solid cellulose materials, including derivatives of cellulose wherein fewer than the three hydroxyl groups of the glucopyranose unit of the cellulosic molecule are substituted by other chemical groups, such as methyl cellulose, ethyl cellulose, carboxymethyl cellulose, and hydroxyethyl cellulose. In these derivatives where only a partial substitution of hydroxyl groups occurs, the product remains a polyhydroxy compound of relatively high molecular weight. Starch, as employed herein, can be a solid or liquid (syrup) based on corn, wheat, rice, potato, tapioca, cassava, or arrowroot. Included within the structural formula and generally referred to as a starch are the natural occurring polysaccharides such as the pectins and agar with an average molecular weight of from about 30,000 to 300,000. For example, starch syrup is a viscous liquid made up principally of pentasaccharides and higher saccharides, with smaller amounts of mono-, di-, and tri-saccharides. The syrup is derived from the incomplete hydrolysis of starch and has the basic structure of starch. Dextran produced from sucrose is also suitable and included within the general formula. The hydroxyl groups are substantially non-reactive with the isocyanate component of the foam-forming mixture under the conditions of the foaming reaction, possibly because the material is present in a separate phase as a solid and the hydroxyl groups are partially hindered sterically. The hydroxyl groups remain available in the foam for the char-forming reactions during any subsequent exposure to conditions of combustion.

(2) Methylol melamine, having the following structure

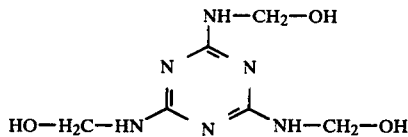

Other compounds useful herein are the various phenolics, as well as polyhydroxyl compounds whose hydroxyl groups are hindered sterically. Relatively low molecular weight hydroxyl bearing compounds, e.g., trimethylol propane, react readily with the isocyanate during foaming and, thus, are not suitable. The critical feature is that the hydroxyl groups, due to steric hindrance, molecular weight, or other causes, are non-reactive or substantially non-reactive with the diisocyanate under the conditions of the foaming reaction.

The flame retardant materials which are useful in the present invention are those conventionally employed as flame retardants in polyurethane foams, both solid and liquid compounds, and, preferably, are those that contain the elements phosphorus, chlorine, bromine, and antimony. The compounds can be organic or inorganic and can be present as reactive compounds in the foam-forming reactions, or they can be incorporated simply as unreactive or additive compounds. Exemplary compounds are the following:

tris(B-chloroethyl)phosphate
tris(dichloropropyl)phosphate
tris(2,3-dibromopropyl)phosphate
dipropylene glycol phosphonate
ammonium polyphosphate
tetrakis(2-chloroethyl)ethylene diphosphate
tetrakis(2-chloroethyl)dichloroneopentyl diphosphate
antimony oxide
decabromo biphenyl ether As used herein, the basic foam-forming components of a flexible polyurethane resin are, in addition to the diisocyanate, any of the conventional polyols for use in forming flexible polyurethane foam such as polyether polyols, polyester polyols, and block polymers of polyether and polyester polyols which are reactive with a diisocyanate under the conditions of the foam-forming reaction as well as various conventional foaming catalysts, surfactants, antioxidants, and the like. The range of molecular weight and range of hydroxyl numbers on the reactive polyols is consistent with the production of flexible foams. Specifically, the molecular weight is from about 1500 to 2000 up to about 6500 to 7000. The hydroxyl number range is from about 20 to 25 up to about 130, and preferably from about 20 to 25 to about 100. As is known in the art, a flexible polyurethane foam can be produced by adjusting the polyol and diisocyanate to each other and/or in the presence of low molecular weight cross-linking or curing agents. Additionally, the flexibility characteristics of a polyurethane foam can be modified by using the isocyanate in less than its stoichiometric amounts. "Flexible foam," as used throughout this specification, has the meaning of a flexible foam as set forth in "Polyurethanes: Chemistry and Technology, Part II Technology," J. H. Saunders & K. C. Frisch, Interscience Publishers, 1964, pages 117 to 159. These flexible foams can have varying degrees of firmness determined by the density characteristics. It is also possible to include blowing agents such as the freons or the like to enhance the foaming operation. Since the various materials used are well known to those skilled in the art of polyurethane foams, they will not be described in detail.

The diisocyanates which are to be employed in accordance with the present invention are also conventional. They include compounds having the general formula $R-(NCX)_z$, where X may be oxygen or sulfur, z an integer of one or more, and R an organic radical. These isocyanates, therefore, may be either aromatic or aliphatic, or mixed aromatic-aliphatic products. Although it is necessary to have more than 50 percent of z in these reactions equal to at least two to promote polymerization, monofunctional compounds are often desirable to modify the product. Preferred isocyanates are toluene 2,4 diisocyanate, toluene 2,6diisocyanate, methylene bis(4-phenyl-isocyanate), 3,3'bitoluene, 4,4'diisocyanate, hexamethylenediisocyanate, and octyldecylisocyanate. This preference is based on the commercial availability of such compounds. However, ethylene diisocyanate, trimethylene diisocyanate, tetramethylene diisocyanate, decamethylene diisocyanate, heptylidene diisocyanate, and the corresponding diisothiocyanates; cycloalkylene diisocyanates and diisothiocyanates, e.g., cyclopentylene diisocyanate, cyclohexylene diisocyanate; aromatic diisocyanates and diisothiocyanates, e.g., m-phenylene diisocyanate, naphthalene diisocyanate, and diphenyl-4,4'-diisocyanate; aliphatic-aromatic diisocyanates and diisothiocyanates, e.g., xylene-1,4-diisocyanate and 4,4'-diphenylenemethane diisocyanate; heterocyclic diisocyanates abd diisothiocyanates, such as $SCNCH_2OCH_2NCS$ and $SCN(CH_2)_3-S-(CH_2)_3NCS$; the isocyanates and isothiocyanates containing more than two functional groups, e.g., benzene 1,2,4-triisothiocyanate, 1,2,2-triisocyanatobutane, toluene triisocyanate; and as modifiers, the monoisocyanates and monothioisocyanates, e.g., octylisocyanate and octadecylisocyanate, can be selected.

To more fully illustrate the present invention, a number of preferred embodiments will be set forth. These embodiments will establish that the foam-forming components can be those conventionally used in the art including the polyester polyols, polyether polyols, grafted polymer polyols of ethers and esters and mixtures thereof. Moreover, the examples will establish the advantages of using the polyol in comparison to conventional flame retardants alone and, additionally, will establish the ability to use lesser amounts of the conventional flame retardant by inclusion of the polyol containing hydroxyl groups non-reactive with the diisocyanate. It is to be understood, however, that these examples are illustrative only and are not set forth as being limiting. Parts are by weight throughout unless otherwise designated.

EXAMPLE 1

This example illustrates an essentially 4.0 lb./cu.ft. flexible polyester urethane foam comparing a conventional formulation containing relatively high amounts of flame retardant additive with a formulation wherein corn starch is incorporated in the foam-forming mixture, the level of flame retardant being reduced.

| Formula | Parts 1a | Parts 1b |
| --- | --- | --- |
| Polyester resin (Multron R-68) | 100 | 100 |
| Toluene Diisocyanate (80:20 Isomer ratio) | 33 | 33 |
| N—Ethyl Morpholine | 2.5 | 2.5 |
| Dimethylcetylamine | 0.2 | 0.2 |
| Diethyl Ammonium Oleate (Witco Fomrez 1058) | 0.5 | 0.5 |
| Organo-Silicone Surfactant (Union Carbide L532) | 1.0 | 1.0 |
| Aqueous Carbon Black Dispersion (69% water) | 1.0 | 1.0 |
| Water | 1.46 | 0.61 |
| Phosgard 2XC20 (Tetrakis (2-Chloroethyl) Dichloroneopentyl Diphosphate) | 25 | 17.0 |
| Corn Starch (contains 10% water) | — | 8.5 |

When tested in accordance with Underwriters' Labs Subject 94 Flammability Test for cellular plastics, Example 1a containing 25 parts of flame retardant burned a distance of 1¼ inch in 39 seconds and released several drops of molten material which caused cotton ignition. Example 1b containing 17 parts of flame retardant and 8.5 parts of corn starch burned a distance of 1⅜ inch in 60 seconds, forming a charry residue that insulated the foam from the flame and effectively prevented the release of molten material. Example 1b retained good load-bearing properties, whereas Example 1a was noted to soften appreciably. Specifically, when compressed to 50 percent of its original height, Example 1b responded with approximately 24 percent more load-bearing values than did Example 1a. This retention of load-bearing characteristics is desirable in applications such as packaging and insulating where the foam must retain its dimensional stability for durable service.

Polyester resin, Multron R-68, is marketed by the Mobay Chemical Company and is a linear type polyester based on adipic acid and diethylene glycol having a molecular weight of approximately 2000.

Organo-silicone surfactant, L532, is marketed by the Union Carbide Corporation and is described in Marlin, U.S. Pat. No. 3,594,334.

EXAMPLE 2

This example illustrates a flexible polyether urethane foam in which the polyol component of the foam-forming mixture is a grafted (polymer) polyol wherein a thermoplastic component such as styrene and acrylonitrile is grafted to the polyether polyol of propylene oxide to introduce reinforcing characteristics to reaction products of the polyol with polyisocyanates.

| Formula | Parts 2a | Parts 2b |
|---|---|---|
| Grafted Polyether Polyol (Pluracol 637) | 100 | 100 |
| Toluene Diisocyanate (80:20 Isomer ratio) | 48.5 | 48.5 |
| N—Ethyl Morpholine | 0.5 | 0.1 |
| Niax A-1 Catalyst (Union Carbide) | 0.25 | 0.18 |
| Organo-Silicone Surfactant (Union Carbide L5710) | 0.80 | 0.80 |
| Stannous Octoate | 0.23 | 0.23 |
| Water | 4.00 | 3.00 |
| Flame Retardant { 14.5 Decabromobiphenyl Ether  7.25 Antimony Oxide | 21.75 | 21.75 |
| Corn Starch (contains 10% water) | — | 10.0 |

When tested in accordance with the test of Example 1, Example 2a burned a distance of 1.4 inches in 25 seconds and released molten drops which ignited the cotton in 2 out of 5 specimens tested. Example 2b containing corn starch burned a distance of 1.5 inches in 31 seconds and none of the five specimens tested released any molten drips. Properties of the two samples illustrating the greater density and the enhanced load-reinforcing action of the corn starch are

| | 2a | 2b |
|---|---|---|
| Density, lbs./cu. ft. | 1.78 | 1.97 |
| Tensile strength, psi | 21.3 | 20.2 |
| Elongation, % | 110 | 90 |
| Tear resistance, ppi | 2.1 | 1.4 |
| Breathability, air flow, CFM | 2.5 | 2.9 |
| Compression set, % (22 hrs. @ 50% compression @ 70° C.) | 6 | 6 |
| Compression load deflection, psi | | |
| @ 25% deflection | 0.68 | 1.00 |
| @ 50% deflection | 0.80 | 1.07 |
| @ 70% deflection | 1.60 | 2.20 |

Polyol Pluracol 637 is a polyol obtained by grafting styrene and acrylonitrile onto a polyether backbone to provide a polyether having essentially secondary hydroxyl groups.

Niax A-1 is an amine type foaming catalyst marketed by the Union Carbide Corporation.

Union Carbide L5710 is a surfactant based on an organosilicone compatible with a polyether polyol foaming system.

EXAMPLE 3

This example illustrates a flexible polyester urethane foam having a low density.

| Formula | Parts 3a | Parts 3b |
|---|---|---|
| Polyester Resin (Fomrez 50) | 100 | 100 |
| Toluene Diisocyanate (80:20 Isomer ratio) | 55.5 | 61.0 |
| N—Ethyl Morpholine | 1.8 | 1.8 |
| Ionol | 0.7 | 0.7 |
| N—Coco Morpholine | 2.0 | 2.0 |
| Dimethylcetylamine | 0.2 | 0.2 |
| Diethyl Ammonium Oleate (Witco Fomrez 1058) | 1.0 | 1.0 |
| Sulfonated Ester (Witco Fomrez M6682A) contains 10% H₂O | 1.0 | 1.0 |
| Aqueous Carbon Black Dispersion (69% water) | 2.0 | 2.0 |
| Water | 2.27 | 1.72 |
| Phosgard 2XC20 | 20 | 16 |
| Corn Starch (contains 10% water) | — | 10.0 |

Example 3a under the test of Example 1 burned a distance of 2 inches in 40 seconds and released molten drops; whereas Example 3b burned a distance of 1.9 inches in 47 seconds and formed a thick char without releasing molten drops. Properties of the respective foams are

| | 3a | 3b |
|---|---|---|
| Density, lbs./cu. ft. | 1.94 | 1.94 |
| Tensile strength, psi | 19.4 | 18.4 |
| Elongation, % | 195 | 130 |
| Tear resistance, ppi | 2.4 | 2.0 |
| Breathability, air flow, CFM | 0.63 | 0.27 |
| Compression set, % | 7 | 8 |
| Compression load deflection, psi | | |
| @ 25% deflection | 0.56 | 0.57 |
| @ 50% deflection | 0.61 | 0.66 |
| @ 70% deflection | 1.30 | 1.40 |

Fomrez 50 is a polyester polyol marketed by Witco Chemical Company and is a linear type polyester based on adipic acid and diethylene glycol utilizing a trimethylol propane branching agent, and has a molecular weight of approximately 2000.

Ionol is butylated hydroxy toluene marketed by Shell Chemical Company as an antioxidant to prevent foam discoloration.

Examples 4-8 illustrate various modifications to the basic foam-forming components with consistent char formation.

EXAMPLE 4

| | |
|---|---|
| Polyester Resin (Hooker F-103) | 100 |
| Toluene Diisocyanate (80:20 Isomer ratio) | 59.7 |
| N—Ethyl Morpholine | 1.8 |
| Ionol | 0.7 |
| N—Coco Morpholine | 2.0 |
| Dimethylcetylamine | 0.2 |
| Diethyl Ammonium Oleate (Witco Fomrez 1058) | 1.0 |
| Sulfonated Ester (Witco Fomrez M6682A) | 1.0 |
| Aqueous Carbon Black Dispersion (69% water) | 2.0 |
| Water | 1.62 |
| Phosgard 2XC20 | 16.0 |
| Corn Starch | 10.0 |

The product, when evaluated with the test of Example 1, burned a distance of 1.4 inches in 32 seconds, forming a dripless, charry residue. Properties were as follows:

| | |
|---|---|
| Density, lbs./cu. ft. | 1.99 |
| Tensile strength, psi | 18.5 |
| Elongation, % | 145 |
| Tear resistance, ppi | 2.0 |
| Breathability, air flow, CFM | 0.9 |
| Compression set, % | 4 |
| Compression load deflection, psi | |
| @ 25% deflection | 0.63 |
| @ 50% deflection | 0.75 |
| @ 70% deflection | 1.43 |

Polyester resin, Hooker F-103, is a polyester polyol marketed by Hooker Chemical Company based on adipic acid and diethylene glycol utilizing a glycerol branching agent and having a molecular weight of approximately 2800.

EXAMPLE 5

| Formula | Parts 5a | Parts 5b |
|---|---|---|
| Polyether Polyol (Niax 14-46) (Union Carbide) | 100 | 100 |
| Toluene Diisocyanate (80:20 Isomer ratio) | 52.2 | 52.2 |
| Niax A-1 Catalyst | 0.15 | — |
| Niax ESN Catalyst | — | 1.2 |
| Organo-Silicone Surfactant (L5710) | 1.0 | 1.0 |
| Aqueous Carbon Black Dispersion (69% water) | 1.0 | 1.0 |
| Stannous Octoate | 0.37 | 0.29 |
| Water | 3.3 | 1.3 |
| Thermolin 101 (Tetrakis(2-Chloroethyl) Ethylene Diphosphate) | 20 | 20 |
| Corn Syrup (contains 19.7% H$_2$O) | — | 10 |

Example 5a using the test of Example 1 burned a distance of 1.0 inch in 20 seconds and released many molten drops, whereas Example 5b burned a distance of 1.75 inches in 42 seconds, forming a charry residue that did not release molten drops. Physical properties are as follows:

| | 5a | 5b |
|---|---|---|
| Density, lbs./cu. ft. | 1.75 | 1.79 |
| Tensile strength, psi | 17.4 | 14.4 |
| Elongation, % | 300 | 310 |
| Tear resistance, ppi | 3.5 | 2.8 |
| Breathability, air flow, CFM | 0.20 to 0.80 | 0.18 to 0.25 |
| Compression load deflection, psi | | |
| @ 25% deflection | 0.47 | 0.39 |
| @ 50% deflection | 0.49 | 0.42 |
| @ 70% deflection | 0.95 | 0.88 |

Polyether polyol, Niax 14-46, is polyether polyol marketed by Union Carbide Corporation having a molecular weight of about 3700 produced by the reaction of a mixture of propylene oxide and ethylene oxide with glycerol. Niax ESN is a tertiary amine foaming catalyst marketed by Union Carbide Corporation.

EXAMPLE 6

| Formula | Parts |
|---|---|
| Grafted Polyether Polyol (Niax E363) | 75 |
| 2000 MW Polyether Polyol (Niax PPG 2025) | 25 |
| Toluene Diisocyanate (80:20 Isomer ratio) | 52.2 |
| N—Ethyl Morpholine | 0.3 |
| Niax A-1 | 0.15 |
| Organo-Silicone Surfactant (L5710) | 0.80 |
| Stannous Octoate | 0.33 |
| Aqueous Carbon Black Dispersion (69% water) | 2.00 |
| Water | 2.00 |
| Deca-bromobiphenyl Ether | 15.0 |
| Antimony Oxide | 7.5 |
| Corn Starch (contains 10% water) | 10.0 |

Example 6 using the test of Example 1 burned an average distance of 1.75 inches in 40 seconds without releasing molten drops. When the corn starch is omitted from the formulation, the foam produced released flaming droplets that ignited the cotton below the apparatus used. Physical properties are as follows:

| | |
|---|---|
| Density, lbs./cu. ft. | 1.76 |
| Tensile strength, psi | 14.4 |
| Elongation, % | 150 |
| Tear resistance, ppi | 1.7 |
| Breathability, air flow, CFM | 2.0 |
| Compression load deflection, psi | |
| @ 25% deflection | 0.61 |
| @ 50% deflection | 0.69 |
| @ 70% deflection | 1.60 |

Niax E363 is a grafted polyether polyol marketed by Union Carbide Corporation which is obtained by reacting an approximately 3000 molecular weight triol with an approximately 20 percent mixture of styrene and acrylonitrile at a 1:1 weight ratio.

Niax PPG 2025 is a polyether polyol marketed by Union Carbide Corporation having a molecular weight of approximately 2000 based on polypropylene glycol.

EXAMPLE 7

| Formula | Parts |
|---|---|
| Polyester Resin (Fomrez 50) | 100 |
| Toluene Diisocyanate (80:20 Isomer ratio) | 58.2 |
| N—Ethyl Morpholine | 1.8 |
| N—Coco Morpholine | 1.0 |
| Dimethylcetylamine | 0.1 |
| Diethyl Ammonium Oleate (Fomrez 1058) | 1.0 |
| Organo-Silicone Surfactant (L532) | 0.8 |
| Water | 4.0 |
| Thermolin 101 | 15.0 |
| Methylol Melamine | 10.0 |
| Physical Properties | |
| Density, lbs./cu. ft. | 1.80 |
| Tensile strength, psi | 21.2 |
| Elongation, % | 150 |
| Tear resistance, ppi | 2.7 |
| Breathability, air flow, CFM | 0.13 |
| Compression set, % | 30 |
| Compression load deflection, psi | |
| @ 25% deflection | 0.48 |

| | Parts |
|---|---|
| @ 50% deflection | 0.89 |
| @ 70% deflection | 2.90 |

The foam, when tested in accordance with the test of Example 1, burned a distance of 1.25 inches in 35 seconds, forming a dripless char.

EXAMPLE 8

| Formula | Parts |
|---|---|
| Polyester Resin (Fomrez 50) | 100 |
| Toluene Diisocyanate (80:20 Isomer ratio) | 52 |
| N—Ethyl Morpholine | 1.8 |
| Butylated Hydroxy Toluene | 0.7 |
| N—Coco Morpholine | 2.0 |
| Dimethylcetylamine | 0.55 |
| Diethyl Ammonium Oleate (Witco Fomrez 1058) | 1.0 |
| Sulfonated Ester (Witco Fomrez M6682A) (contains 10% H$_2$O) | 1.0 |
| Aqueous Carbon Black Dispersion (69% H$_2$O) | 2.0 |
| Water | 2.62 |
| Tris (B-Chloroethyl) Phosphate (Stauffer Fyrol CEF) | 15 |
| Cellulose (Brown Co. Solka-Floc) | 14 |

Solka-Floc is a tradename of the Brown Company for pure, finely-divided cellulose, non-abrasive and relatively inert to acids, alkalies, and solvents, and practically ashless; and, when bone dry, is at least 99.5 percent cellulose. The foam produced, when burnt, formed a dripless char.

As will be apparent from the above, the polyol resin which can be utilized in the present invention can be any of the polyol resins conventionally used in forming flexible polyurethane foams. The flame retardants and the unreactive polyols are compatible with all conventional systems. Furthermore, as will be apparent, it is possible to vary the amount of flame retardant material in the foam formulation over relatively wide ranges. As a rule of thumb, it is possible to use from about 5 to 35 parts of flame retardant material per 100 parts of reactive polyol depending upon the particular flame retardant and polyol employed. The optimum amounts can be readily determined by simple tests. It is also possible to vary the amount of unreactive polyol over relatively wide ranges. Again as a rule of thumb, it is possible to vary the amount from about 4 parts to 30 parts of unreactive polyol per 100 parts of reactive polyol. It has been found, as seen from the examples, that the presence of the unreactive polyol permits the reduction in the amount of flame retardant material to about from 15 to 60 percent of the amount conventionally employed. The actual reduction again depends upon the particular polyol, flame retardant material, and unreactive polyol selected.

It is to be appreciated that while there are above disclosed but a limited number of embodiments of this invention, it is possible to produce still other embodiments without departing from the inventive concept herein disclosed.

It is claimed:

1. A flexible polyurethane foam comprising the foam-forming reaction product of water as a foaming agent, a reactive polyol and a diisocyanate and including uniformly contained in said foam a flame retardant agent and an unreacted polyol having the empirical formula of $(C_6H_{10}O_5)_x$ wherein X is in excess of about 60 and containing hydroxyl groups substantially unreacted with said diisocyanate, said water being present in an amount sufficient to provide a flexible foam, and said flame retardant agent and unreacted polyol being present in an amount sufficient to inhibit flaming and to form a substantially dripless char when said foam is subjected to combustion temperatures.

2. The foam of claim 1 wherein said unreacted polyol is present as small, solid particles.

3. The foam of claim 1 wherein said unreacted polyol is starch.

4. The foam of claim 1 wherein said unreacted polyol is cellulose.

5. The foam of claim 1 wherein said flame retardant agent is a phosphorus containing compound.

6. The foam of claim 1 wherein said flame retardant agent is a chlorine or bromine containing compound.

7. The foam of claim 1 wherein the reactive polyol is a polyether and said diisocyanate is toluene diisocyanate.

8. The foam of claim 1 wherein the reactive polyol is a polyester and said diisocyanate is toluene diisocyanate.

9. The method of forming a flame retardant and dripless char-forming flexible polyurethane foam comprising admixing a foam-forming formulation including water as a foam agent, a reactive polyol, diisocyanate, a flame retardant agent, and an unreactive polyol having the empirical formula of $(C_6H_{10}O_5)_x$ wherein X is in excess of about 60 and containing a plurality of hydroxyl groups substantially non-reactive with said diisocyanate under foam-forming conditions; subjecting said foam-forming formulation to foaming conditions to form a flexible polyurethane foam having said flame retardant agent and unreacted polyol uniformly contained in said foam, said water being present in an amount sufficient to provide a flexible foam, and said flame retardant agent and unreacted polyol being present in an amount sufficient to inhibit flaming and to form a substantially dripless char when said foam is subjected to combustion temperatures.

10. The method of claim 9 wherein said polyol is a solid and is present in said foam after the foam-forming reaction as small particles.

11. The method of claim 9 wherein said flame retardant agent is a phosphorus containing compound.

12. The method of claim 9 wherein said flame retardant agent is a chlorine or bromine containing compound.

13. The method of claim 9 wherein the reactive polyol is a polyether and said diisocyanate is toluene diisocyanate.

14. The method of claim 9 wherein the reactive polyol is a polyester and said diisocyanate is toluene diisocyanate.

15. The method of claim 9 wherein said unreacted polyol is starch.

16. The method of claim 9 wherein said unreacted polyol is cellulose.

* * * * *